United States Patent
Yoon

(10) Patent No.: US 7,844,231 B2
(45) Date of Patent: Nov. 30, 2010

(54) APPARATUS AND METHOD FOR TRANSMIT/RECEIVE ANTENNA SWITCH IN A TDD WIRELESS COMMUNICATION SYSTEM

(75) Inventor: Hyun-Su Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 164 days.

(21) Appl. No.: 12/357,754

(22) Filed: Jan. 22, 2009

(65) Prior Publication Data

US 2009/0190509 A1   Jul. 30, 2009

(30) Foreign Application Priority Data

Jan. 29, 2008   (KR) ...................... 10-2008-0008863

(51) Int. Cl.
   *H04B 1/44*   (2006.01)
(52) U.S. Cl. ...................... 455/83; 455/127.1; 455/269; 455/550; 342/374; 343/876
(58) Field of Classification Search ............ 455/83, 455/127.1, 269, 550, 562.1, 569, 341, 414.1, 455/78; 342/374; 343/876
   See application file for complete search history.

(56) References Cited

U.S. PATENT DOCUMENTS

| | | | | |
|---|---|---|---|---|
| 3,922,685 A | * | 11/1975 | Opas | 342/372 |
| 4,028,645 A | * | 6/1977 | Tressa | 333/17.3 |
| 4,153,886 A | * | 5/1979 | Miedema | 333/156 |
| 4,153,994 A | * | 5/1979 | Ren | 333/157 |
| 4,160,952 A | * | 7/1979 | Seastrand, Jr. | 455/276.1 |
| 4,217,554 A | * | 8/1980 | Brzozowski | 330/124 R |
| 4,232,399 A | * | 11/1980 | Heiter | 455/276.1 |
| 5,349,364 A | * | 9/1994 | Bryanos et al. | 343/853 |
| 5,373,299 A | * | 12/1994 | Ozaki et al. | 342/373 |
| 6,839,549 B2 | * | 1/2005 | Pehlke et al. | 455/127.1 |
| 7,450,066 B2 | * | 11/2008 | Haskell | 342/368 |
| 2008/0102763 A1 | * | 5/2008 | Yoon | 455/78 |
| 2010/0056070 A1 | * | 3/2010 | Miyake et al. | 455/75 |
| 2010/0171567 A1 | * | 7/2010 | Krishnaswamy et al. | 333/164 |

* cited by examiner

*Primary Examiner*—Minh D Dao
(74) *Attorney, Agent, or Firm*—Jefferson IP Law, LLP

(57) ABSTRACT

An apparatus and method in a Time Division Duplex (TDD) wireless communication system are provided. The apparatus includes two 90° hybrid couplers and a phase converter block. The two 90° hybrid couplers each separate a signal into two signals and output the two signals, and each couple two signals and output the coupled signal. The phase converter block connects between the two 90° hybrid couplers. In a transmission mode, the phase converter block identically varies phases of two signals and outputs the varied two signals to the second 90° hybrid coupler. In a reception mode, the phase converter block varies phases of two signals and outputs the varied two signals to the first 90° hybrid coupler.

20 Claims, 7 Drawing Sheets

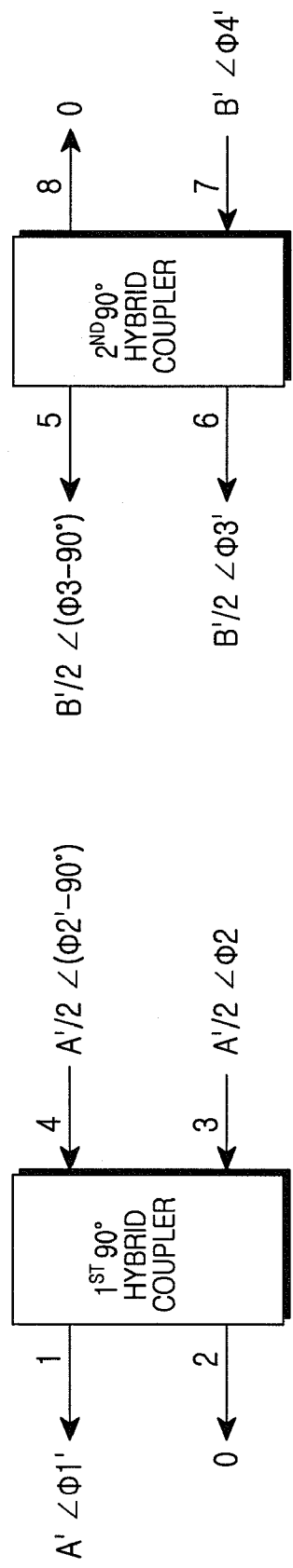

APPARATUS AND METHOD FOR TRANSMIT/RECEIVE ANTENNA SWITCH IN A TDD WIRELESS COMMUNICATION SYSTEM

PRIORITY

This application claims the benefit under 35 U.S.C. §119(a) of a Korean patent application filed in the Korean Intellectual Property Office on Jan. 29, 2008 and assigned Serial No. 10-2008-0008863, the entire disclosure of which is hereby incorporated by reference.

BACKGROUND OF THE INVENTION

1. Field of the Invention

The present invention relates to an apparatus and method for a Transmit/Receive Antenna Switch (TRAS) in a Time Division Duplex (TDD) wireless communication system. More particularly, the present invention relates to an apparatus and method for protecting a Low Noise Amplifier (LNA) from a Radio Frequency (RF) transmit signal.

2. Description of the Related Art

In general, a Transmit/Receive Antenna Switch (TRAS) performs a function of switching between a high power Radio Frequency (RF) transmit signal and a low power RF receive signal in a Time Division Duplex (TDD) wireless communication system. A TDD system divides the same frequency in time and uses the divided frequencies for transmission and reception. In a transmission mode, the TRAS blocks the introduction of a transmit power into a Low Noise Amplifier (LNA) of a receiving end, thus protecting the LNA. In a reception mode, the TRAS reduces an amount of noise introduced from a transmit end, thus preventing a reduction in sensitivity when receiving a signal.

FIG. 1 is a block diagram illustrating a construction of a TDD wireless communication system using a TRAS according to the conventional art.

Referring to FIG. 1, a TDD controller 100 divides a transmission/reception frame by units of time and outputs a control signal for controlling an operation of a transmission/reception mode depending on the divided time. The control signal is output to a transmitter 102, a receiver 106, and a TRAS 110. A Power Amplifier (PA) 104 amplifies a transmit signal from the transmitter 102 and outputs the amplified signal to the TRAS 110. An LNA 108 low-noise amplifies a receive signal from the TRAS 110 and outputs the amplified signal to the receiver 106.

The TRAS 110 switches between a transmission path and a reception path depending on a control signal from the TDD controller 100 and performs an operation corresponding to a transmission mode or reception mode, respectively. That is, when receiving a control signal indicating a transmission mode operation from the TDD controller 100, the TRAS 110 connects a transmission path from the PA 104 to an antenna 114, thus outputting a transmit signal received from the PA 104 to a Front End Block (FEB) 112. At this time, the TRAS 110 prevents the introduction of the high power transmit signal into the LNA 108. When receiving a control signal indicating a reception mode operation from the TDD controller 100, the TRAS 110 connects a reception path from the antenna 114 to the LNA 108, thus outputting a signal received from the FEB 112 to the LNA 108. At this time, the TRAS 110 reduces an amount of noise received from the PA 104.

In the transmission mode of the TDD wireless communication system, an insertion loss of the transmission path ranging from the PA 104 to the antenna 114 may have influence on a capacity of the PA 104. To reduce this loss, the TRAS 110 has to be designed and constructed to minimize the insertion loss of the transmission path and isolate the LNA 108 of a receiving end from the transmission path. In the reception mode, an insertion loss of the reception path ranging from the antenna 114 to the LNA 108 and a noise degree of an input signal of the LNA 108 have influence on reception performance. Thus, the TRAS 110 has to be designed and constructed to minimize the insertion loss of the reception path and isolate an output end of the PA 104 from the reception path.

By realizing a function of a TRAS using an RF switch 205 of FIG. 2 or using a circulator 334 and a reflector 338 of FIG. 3, a conventional TDD wireless communication system isolates transmission/reception paths and protects an LNA of a receiving end.

A conventional method using a Single Pole Double Throw (SPDT) RF switch 205 is described below with reference to FIG. 2.

Referring to FIG. 2, in a transmission mode, the SPDT RF switch 205 is switched to forward a transmit signal from a transmitter 201 to an antenna feed line and, in a reception mode, is switched to forward a receive signal from the antenna feed line to a receiver 203. That is, the RF switch 205 switches transmission/reception paths by a TDD control signal. However, the electrical RF switch used in the above method has the disadvantages of being expensive and being difficult to implement.

A conventional method using a circulator 334 and a reflector 338 is briefly described below with reference to FIG. 3.

Referring to FIG. 3, according to directionality shown in a TRAS 330, the circulator 334 forwards a signal from a transmitter 310, a PA 312 and an isolator 332 to an FEB 350 and an antenna 352 and forwards a signal from the FEB 350 to the reflector 338 and potentially to an LNA 322 and a Receiver 320.

A first controller 336 turns ON/OFF a reflection operation of the reflector 338 depending on a transmission/reception mode indicated by a control signal from a TDD controller 300. If the reflection operation of the reflector 338 turns ON, a signal output from the circulator 334 is totally reflected by the reflector 338 and is terminated by the isolator 332. If the reflection operation of the reflector 338 turns OFF, a signal output from the circulator 334 is forwarded to a high frequency switch 342 by the reflector 338.

A second controller 340 turns ON/OFF a switching operation of the high frequency switch 342 depending on a transmission/reception mode indicated by a control signal of the TDD controller 300. If the high frequency switch 342 is switched OFF, a signal from the reflector 338 is not forwarded to the LNA 322. If the high frequency switch 342 is switched ON, a signal from the reflector 338 is forwarded to the LNA 322 and then to the Receiver 320.

By providing isolation of a high frequency signal between the transmission/reception paths as above, the method using the circulator and the reflection block can prevent the introduction of a high frequency transmit signal into the LNA, and has an advantage of size and cost aspects compared to the method using the RF switch.

However, the method using the circulator and reflection block has a problem in that, if a failure of power supply to the TRAS occurs, it is not possible to isolate the transmission/reception paths and thus it is not possible to protect the LNA from the high frequency transmit signal. If it is intended to protect the LNA even when a failure of power supply occurs, the method requires a complex structure to control several blocks depending on a state of the TRAS.

Accordingly, there is a need for an improved apparatus and method for a Transmit/Receive Antenna Switch (TRAS) in a Time Division Duplex (TDD) wireless communication system.

SUMMARY OF THE INVENTION

An aspect of the present invention is to address at least the above-mentioned problems and/or disadvantages and to provide at least the advantages below. Accordingly, an aspect of the present invention is to provide an apparatus and method for Transmit/Receive Antenna Switch (TRAS) in a Time Division Duplex (TDD) wireless communication system.

Another aspect of the present invention is to provide an apparatus and method for protecting a Low Noise Amplifier (LNA) of a receiving end from a high frequency transmit signal in a TDD wireless communication system.

A further aspect of the present invention is to provide an apparatus and method for protecting an LNA of a receiving end even if power is not supplied to a TRAS in a TDD wireless communication system.

Still another aspect of the present invention is to provide an apparatus and method for protecting an LNA of a receiving end if a transmit signal is reflected due to the occurrence of a failure of a transmission path in a TDD wireless communication system.

Yet another aspect of the present invention is to provide an apparatus and method for providing high frequency isolation between transmission/reception paths using a 90° hybrid coupler and an element for adjusting and compensating a phase of a signal in a TDD wireless communication system.

Another aspect of the present invention is to provide an apparatus and method for providing high frequency isolation between transmission/reception paths using a 90° hybrid coupler and a Radio Frequency (RF) switch in a TDD wireless communication system.

The above aspects are achieved by providing an apparatus and method for TRAS in a TDD wireless communication system.

According to an aspect of the present invention, an apparatus in a Time Division Duplex (TDD) wireless communication system is provided. The apparatus includes two 90° hybrid couplers and a phase converter block. The two 90° hybrid couplers each separate a signal input through any one of four input/output ports into two signals with a phase difference of 90° between them and output the two signals through two of the four input/output ports, and each couple two signals input through two of the four input/output ports and output the coupled signal through one of the four input/output ports that varies depending on a phase difference of the two signals. The phase converter block connects between the two 90° hybrid couplers and, in a transmission mode, varies phases of two signals received from the first 90° hybrid coupler among the two 90° hybrid couplers and outputs the varied two signals to the second 90° hybrid coupler and, in a reception mode, varies phases of two signals received from the second 90° hybrid coupler among the two 90° hybrid couplers by a difference value and outputs the varied two signals to the first 90° hybrid coupler.

According to another aspect of the present invention, a method of controlling a TRAS apparatus in a TDD wireless communication system is provided. The method includes, in a transmission mode, separating a transmit signal from a transmitter into two transmit signals having a phase difference of 90° between them through a first 90° hybrid coupler, varying phases of the separated two transmit signals by a substantially identical value through a phase converter block, coupling the varied transmit signals as one transmit signal through a second 90° hybrid coupler, and outputting the coupled signal to an antenna and, in a reception mode, separating a receive signal from the antenna into two receive signals having a phase difference of 90° between them through the second 90° hybrid coupler, varying phases of the separated two receive signals by a difference value through the phase converter block, coupling the varied receive signals through the first 90° hybrid coupler, and outputting the coupled signal to a receiver.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which:

FIGS. 6A and 6B are diagrams illustrating an operation of a 90° hybrid coupler if a failure of a transmission path occurs during a transmission mode in a TRAS apparatus according to an exemplary embodiment of the present invention.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A description of an apparatus and method for providing high frequency isolation between transmission/reception paths using a 90° hybrid coupler and an element for adjusting a phase of a signal and compensating for a phase difference according to an exemplary embodiment of the present invention is made below. The 90° hybrid coupler is a device used for signal separation or signal coupling. If a signal is input through one port for signal separation, the 90° hybrid coupler separates the input signal into two signals, each signal having an amplitude of ½ of the original amplitude and a phase difference of 90° between them, and outputs the separated signals through two ports, respectively. If two signals are input through two ports for the signal coupling, the 90° hybrid coupler outputs a coupled signal using a different port depending on a phase difference between the two signals. Such a feature of the 90° hybrid coupler is described below in more detail with reference to FIGS. 5 to 7.

Figure 1:
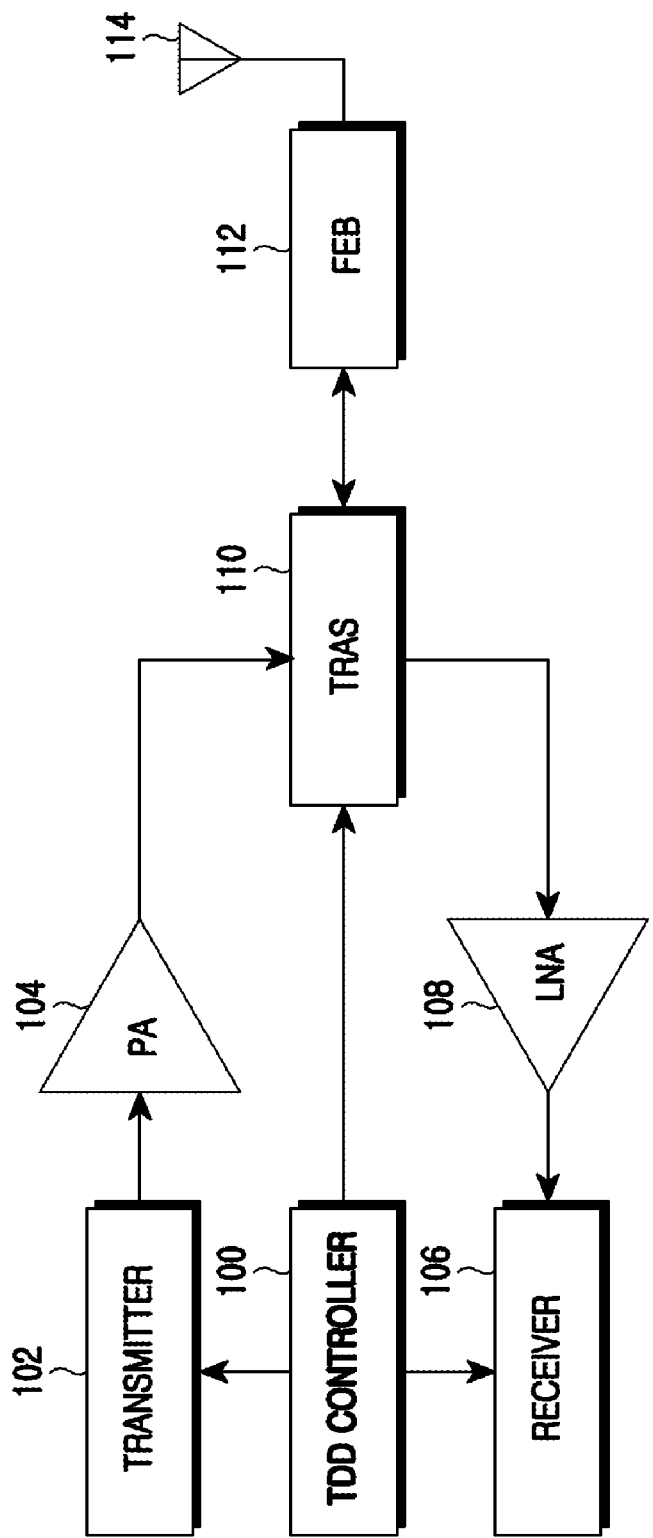
FIG. 1 is a block diagram illustrating a construction of a Time Division Duplex (TDD) wireless communication system using a Transmit/Receive Antenna Switch (TRAS) according to the conventional art.
Figure 2:
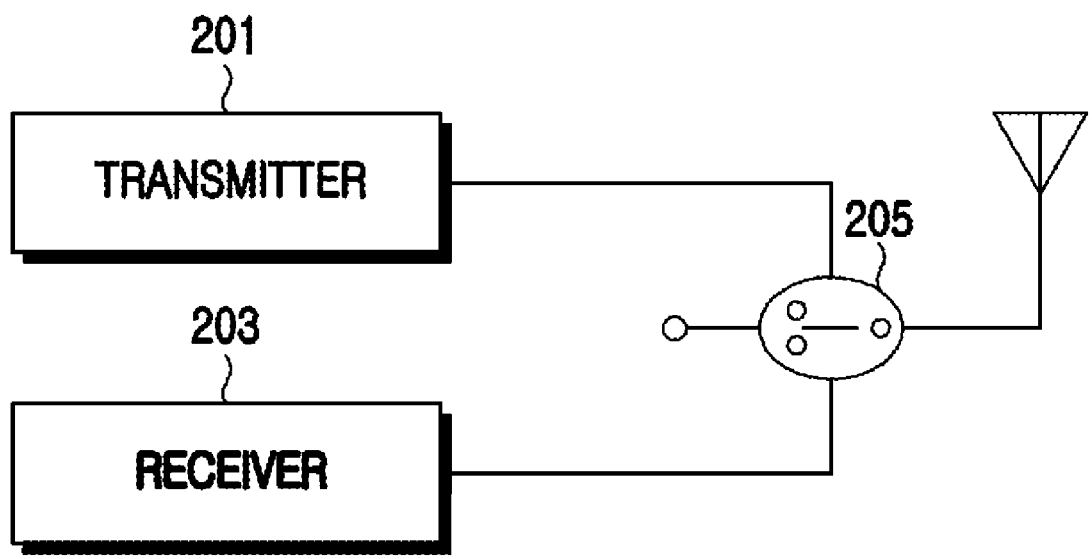
FIG. 2 is a block diagram illustrating a construction of an apparatus for a TRAS using a Radio Frequency (RF) switch according to the conventional art.
Figure 3:
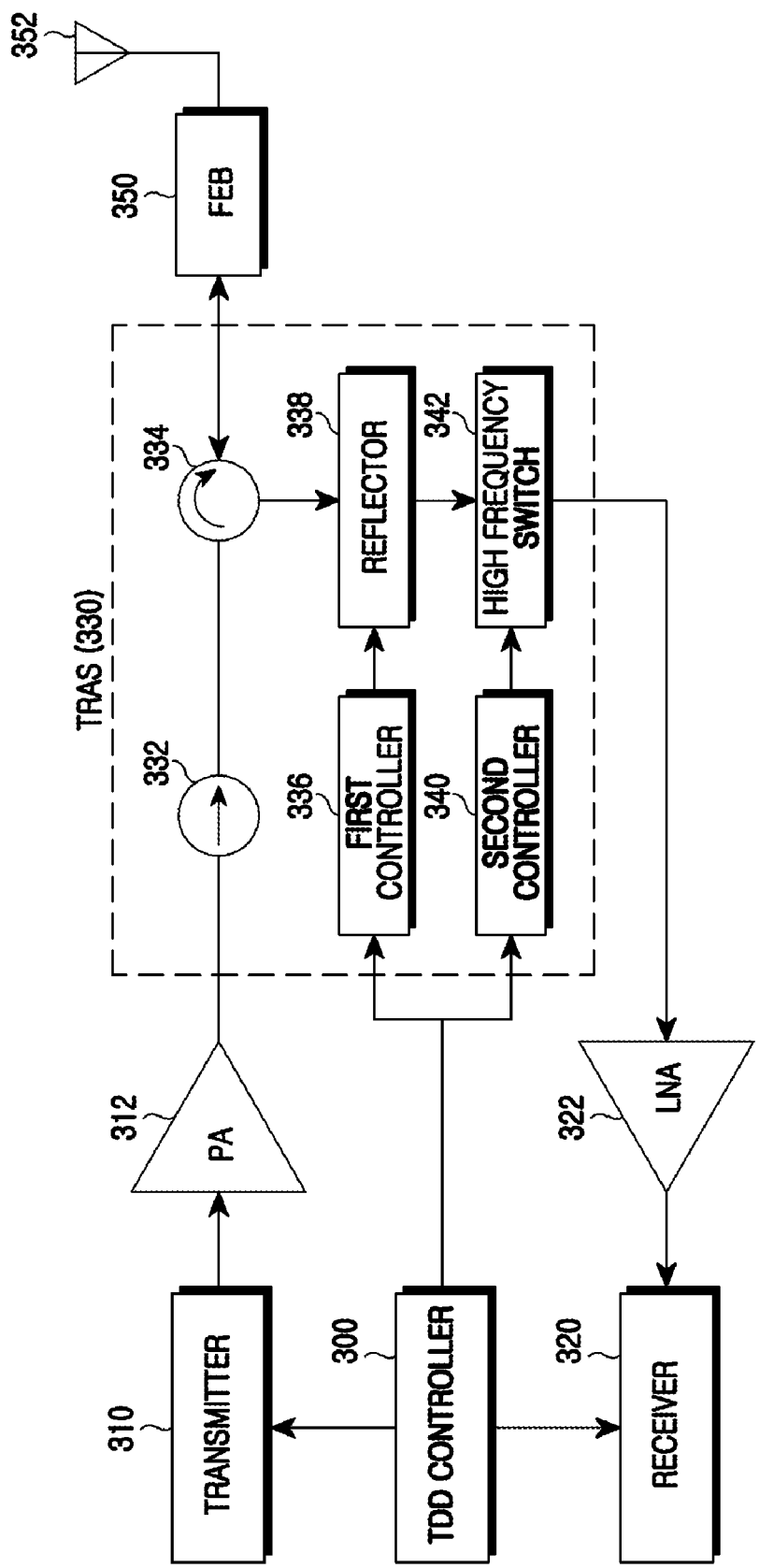
FIG. 3 is a block diagram illustrating a construction of an apparatus for TRAS in a TDD wireless communication system according to the conventional art.
Figure 4:
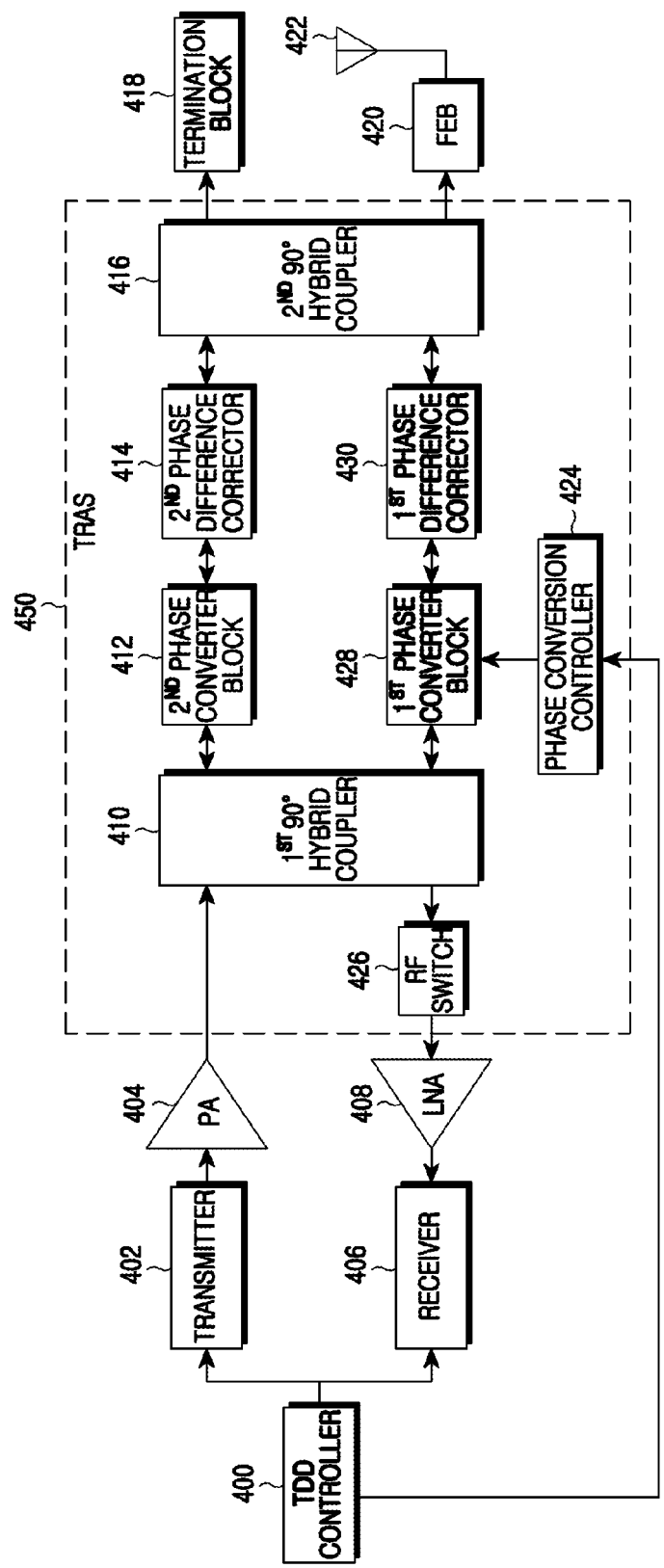
FIG. 4 is a block diagram illustrating a construction of a TRAS in a Time Division Duplex (TDD) wireless communication system according to an exemplary embodiment of the present invention.

FIG. 4 is a block diagram illustrating a construction of a TRAS in a Time Division Duplex (TDD) wireless communication system according to an exemplary embodiment of the present invention.

As shown in FIG. 4, a transmitting/receiving end of the TDD wireless communication system includes a TDD controller 400, a transmitter 402, a Power Amplifier (PA) 404, a receiver 406, a Low Noise Amplifier (LNA) 408, a TRAS apparatus 450, a termination block 418, a Front End Block (FEB) 420, and an antenna 422.

The TRAS apparatus 450 includes a first 90° hybrid coupler 410, a second 90° hybrid coupler 416, a first two-state phase converter block 428, a second two-state phase converter block 412, a first phase difference corrector 430, a second phase difference corrector 414, a phase conversion controller 424, and a Radio Frequency (RF) switch 426. Although not shown in FIG. 4, in an exemplary implementation, an isolator can be included between an output end of the PA 404 and the first 90° hybrid coupler 410.

Referring to FIG. 4, the TDD controller 400 time divides a signal frame and outputs a control signal for controlling a transmission/reception mode operation depending on the divided time, to the transmitter 402, the receiver 406, and the phase conversion controller 424.

The PA 404 amplifies a transmit signal received from the transmitter 402 and outputs the amplified signal to the first 90° hybrid coupler 410. The LNA 408 low-noise amplifies a receive signal output from the first 90° hybrid coupler 410 and outputs the amplified signal to the receiver 406.

Figures 5A, 5B:
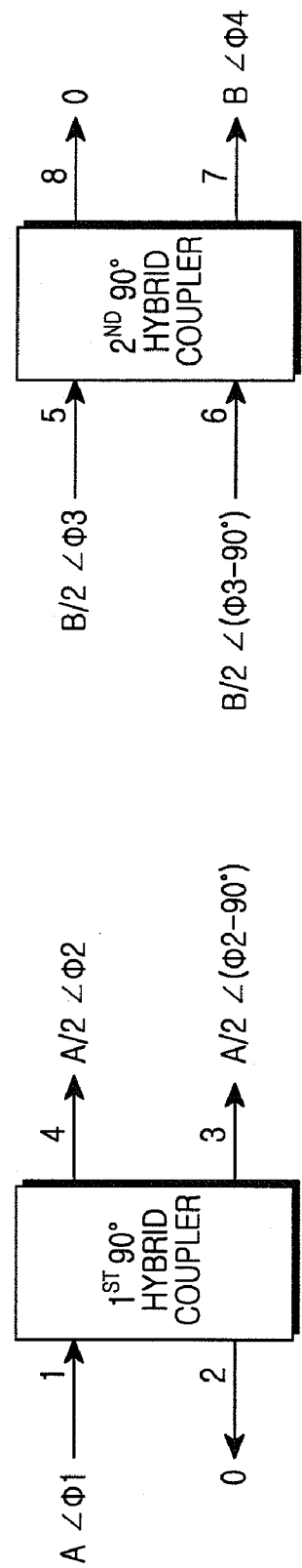
FIGS. 5A and 5B are diagrams illustrating an operation of a 90° hybrid coupler in a transmission mode in a TRAS apparatus according to an exemplary embodiment of the present invention.

In a transmission mode, according to a characteristic illustrated in FIG. 5A, the first 90° hybrid coupler 410 separates a transmit signal received from the PA 404 into two signals, each having an amplitude of ½ the received signal and a phase difference of 90° between each other, outputs the separated signals to the first and second two-state phase converter blocks 428 and 412, and prevents an output of the transmit signal to the LNA 408. In a reception mode, according to a characteristic illustrated in FIG. 7A, the first 90° hybrid coupler 410 receives two signals, having the same amplitude and a phase difference of 90° between each other, from the first and second two-state phase converter blocks 428 and 412, couples the two signals, outputs the coupled signal to the LNA 408, and prevents an output of the received signals to the PA 404.

The first 90° hybrid coupler 410 performs a normal operation although power is not applied to the TRAS 450 due to the occurrence of a failure of a system power supply, powering off of the TRAS 450, etc. Thus, although power is not applied to the TRAS 450 during a transmission mode operation of the system, the first 90° hybrid coupler 410 can prevent the introduction of a high frequency transmit signal generated from the transmitter 402 into the LNA 408. Also, according to a characteristic illustrated in FIG. 6A, even if a transmit signal is reflected and input to the TRAS 450 due to an abnormal connection or erroneous operation of the FEB 420 or antenna 422, the first 90° hybrid coupler 410 can protect the LNA 408 by turning back the reflected transmit signal to the transmitter 402. The reflected transmit signal is absorbed by the isolator (not shown).

The phase conversion controller 424 converts a transmission/reception mode control signal, which is received from the TDD controller 400, into a signal having a type recognizable by the first two-state phase converter block 428, and outputs the converted signal to the first two-state phase converter block 428. For example, the phase conversion controller 424 can convert a transmission/reception mode control signal into '0' or '1' and output the converted signal to the first two-state phase converter block 428. Even in a state where power is not applied to the TRAS 450, the phase conversion controller 424 outputs the same control signal as in a transmission mode to the first two-state phase converter block 428. That is, even in a state where a failure of a system power supply occurs or power is not applied to the TRAS 450, if the TRAS 450 operates in the transmission mode and a transmit signal is output from the transmitter 402, the receiver 406 is isolated from the transmit signal, thus protecting the LNA 408.

The first two-state phase converter block 428 delays an input signal and varies an amplitude and phase of the input signal. The first two-state phase converter block 428 differently controls a phase variation amount of the input signal depending on the transmission/reception mode control signal received from the phase conversion controller 424. In other words, when a transmission mode is identified from the control signal, the first two-state phase converter block 428 delays a transmit signal received from the first 90° hybrid coupler 410, varies an amplitude and phase of the transmit signal (i.e. $\Delta E$, $\Delta \Phi$), and outputs the varied signal to the first phase difference corrector 430. When a reception mode is identified from the control signal, the first two-state phase converter block 428 delays a receive signal received from the first phase difference corrector 430, varies an amplitude of the receive signal (i.e. $\Delta E$), varies a phase of the receive signal (i.e $\Delta \Phi$), additionally varies the phase by 180°, and outputs the varied receive signal to the first 90° hybrid coupler 410. Here, the signal delay amounts of the first two-state phase converter block 428 are identical irrespective of the transmission/reception modes. Also, the value ($\Delta \Phi$) for phase variation denotes a magnitude of a phase varied by the first two-state phase converter block 428 itself, and the phase amount varied in the transmission mode by the first two-state phase converter block 428 and the signal phase amount varied in the reception mode have a difference of 180°. Here, the first two-state phase converter block 428 performs the same operation as in the transmission mode by receiving the same signal as in the transmission mode from the phase conversion controller 424 in circumstances in which power is not applied to the TRAS 450 due to a failure of a system power supply, powering off of the TRAS 450, etc.

The second two-state phase converter block 412 identically delays an input signal irrespective of the transmission/reception modes and varies an amplitude and phase (i.e. $\Delta E$, $\Delta \Phi$). That is, the second two-state phase converter block 412 varies, by ($\Delta E$, $\Delta \Phi$), an amplitude and phase of a signal received from the first 90° hybrid coupler 410 and outputs the varied signal to the second phase difference corrector 414. The second two-state phase converter block 412 identically varies, by $\Delta E$ and $\Delta \Phi$, an amplitude and phase of a signal received from the second phase difference corrector 414 and outputs the varied signal to the first 90° hybrid coupler 410. That is, irrespective of the transmission/reception mode, the second two-state phase converter block 412 varies a phase of an input signal by the same amount as a phase amount varied by the first two-state phase converter block 428.

The first and second phase difference correctors 430 and 414 are comprised of variable phase shifters. Thus, in a transmission mode, the first and second phase difference correctors 430 and 414 may compensate for a phase difference, which can be caused by elements on each path, and maintain a phase difference of 90° between signals input to the second 90° hybrid coupler 416. Even in a reception mode, the first and second phase difference correctors 430 and 414 may compensate for a phase difference, which can be caused by elements on each path, and maintain a phase difference of 90° between signals input to the first 90° hybrid coupler 410. The first and second phase difference correctors 430 and 414 are comprised of variable phase shifters of the same construction, thus having the same delay characteristic excepting that there is merely a difference of a phase variation amount between the first and second phase difference correctors 430 and 414.

In a transmission mode, the RF switch 426, comprising a Single Pole Single Throw (SPST) RF switch in an exemplary implementation, is opened and therefore blocks a path from the first 90° hybrid coupler 410 to the LNA 408. That is, because an isolation characteristic of the first 90° hybrid coupler 410 blocking the introduction of a high frequency transmit signal into the LNA 408 in the transmission mode may not be at a level to sufficiently protect the LNA 408, the RF switch 426 compensates for this and protects the LNA 408 from the high frequency transmit signal.

By constructing the first and second two-state phase converter blocks 428 and 412 as having substantially the same structure and constructing the first and second phase difference correctors 430 and 414 as having substantially the same structure, a path connecting from the first two-state phase converter block 428 to the first phase difference corrector 430 and a path connecting from the second two-state phase converter block 412 to the second phase difference corrector 414 have substantially the same delay characteristic. Also, the first two-state phase converter block 428 has a different phase variation amount depending on the transmission/reception modes, whereby the path from the first two-state phase converter block 428 to the first phase difference corrector 430 and the path from the second two-state phase converter block 412 to the second phase difference corrector 414 have substantially the same phase variation amount in the transmission mode, while having phase variation amounts inverted by 180° with each other in the reception mode.

In a transmission mode, according to a characteristic illustrated in FIG. 5B, the second 90° hybrid coupler 416 couples, as one signal, two transmit signals having the same amplitude and a phase difference of 90° received from the first and second phase difference corrector 430 and 414, outputs the coupled signal to the FEB 420, and prevents an output of the transmit signals to the termination block 418. In a reception mode, according to a characteristic illustrated in FIG. 7B, the second 90° hybrid coupler 416 separates a signal received from the FEB 420 into two signals having an amplitude of ½ and a phase difference of 90° between each other, outputs the separated signals to the first and second phase difference corrector 430 and 414, and prevents an output of the received signal to the termination block 418.

The second 90° hybrid coupler 416 performs a normal operation even if power is not applied to the TRAS 450 due to the occurrence of a failure of a system power supply, powering off of the TRAS 450, etc. Thus, although power may not be applied to the TRAS 450 during a transmission mode operation of the system, the second 90° hybrid coupler 416 can prevent the introduction of a high frequency transmit signal generated from the transmitter 402 into the LNA 408. Also, according to a characteristic illustrated in FIG. 6B, even if a transmit signal is reflected and input to the TRAS 450 due to an abnormal connection or erroneous operation of the FEB 420 or antenna 422, the second 90° hybrid coupler 416 can protect the LNA 408 by turning back the reflected transmit signal to the transmitter 402. The reflected transmit signal is absorbed by the isolator.

In a reception mode, the RF switch 426 is closed and thus connects a path ranging from the first 90° hybrid coupler 410 to the LNA 408, thereby forwarding a receive signal to the LNA 408 with substantially no loss.

An exemplary operation based on the construction of FIG. 4 is described below in more detail with reference to FIGS. 5 to 7.

First, a more detailed operation in a transmission mode is described with reference to FIGS. 5A and 5B.

In the transmission mode, a transmit signal is output from the transmitter 402 through the PA 404, and is radiated through a path of an isolator (not shown)→first 90° hybrid coupler 416→first and second two-state phase converter blocks 428 and 412→first and second phase difference correctors 430 and 414→second 90° hybrid coupler 416→FEB 420→antenna 422. In the transmission mode, it is important to avoid introducing a high power transmit signal, which is output from the transmitter 402, into the LNA 408.

A transmit signal is output from the PA 404, and is input to a port 1 of the first 90° hybrid coupler 410 through the isolator (not shown). As shown in FIG. 5A, a transmit signal (A $\angle$ $\Phi$ 1) is input through the port 1, and is separated into two signals (A/2 $\angle$ 2, A/2 $\angle$ ($\Phi$ 2−90°)) having an amplitude of ½ of the transmit signal and a phase difference of 90° between each other. The separated two signals (A/2 $\angle$ $\Phi$ 2, A/2 $\angle$ ($\Phi$ 2−90°)) are input to the second and first two-state phase converter blocks 412 and 428 through ports 4 and 3, respectively. A port 2 of the first 90° hybrid coupler 410 is isolated and the RF switch is in an open state, thus avoiding the introduction of the transmit signal into the LNA 408. After being input to the second and first two-state phase converter blocks 412 and 428, the separated two transmit signals (A/2 $\angle$ $\Phi$ 2, A/2 $\angle$ ($\Phi$ 2−90°)) are delayed by substantially the same amount, and are varied by substantially the same amplitude ($\Delta$ E) and substantially the same phase ($\Delta$ $\Phi$) (i.e., A/2 $\angle$ $\Phi$ 2→B/2 $\angle$ $\Phi$ 3, A/2 $\angle$ ($\Phi$ 2−90°)→B/2 $\angle$ ($\Phi$ 3−90°)), and are input to the second and first phase difference correctors 414 and 430, respectively. After being input to the second and first phase difference correctors 414 and 430, the signals (B/2 $\angle$ $\Phi$ 3, B/2 $\angle$ ($\Phi$ 3−90°)) each are delayed by substantially the same amount, are corrected for phase differences that can be generated in elements of their respective transmission paths, and maintain a phase difference of 90° as shown in FIG. 5B, and are input to ports 5 and 6 of the second 90° hybrid coupler 416. After being input through the ports 5 and 6, the two transmit signals (B/2 ∠ Φ3, B/2 ∠ (Φ3−90°)) are coupled as one transmit signal (B ∠ Φ4) and input to the FEB 420 through a port 7 of the second 90° hybrid coupler 416, thus being radiated through the antenna 422.

In an event that power is not applied to the TRAS 450, for example, due to a failure of a power supply of the whole system, powering off of the TRAS 450, etc. during a transmission mode operation of the system, the phase conversion controller 424 provides the same control signal as in a transmission mode to the first two-state phase converter block 428 and thus the TRAS 450 normally operates as in the transmission mode, thereby being able to prevent the introduction of the high power high frequency transmit signal into the LNA 408.

An exemplary operation if a failure of a transmission path occurs during a transmission mode is described in detail with reference to FIGS. 6A and 6B.

If a failure of a transmission path occurs during a transmission mode operation, that is, if a high power high frequency transmit signal is reflected back to the TRAS 450 due to a failure of the FEB 420 or antenna 422, according to characteristics of the first and second 90° hybrid couplers 410 and 416 shown in FIGS. 6A and 6B, the transmit signal is output to the PA 404 and is not introduced into the LNA 408. The reflected transmit signal is absorbed by the isolator (not shown) included in the output end of the PA 404, thus having no influence on the PA 404. The isolator (not shown) may be included within the PA 404 or provided between the PA 404 and the first 90° hybrid coupler 410.

In more detail, as shown in FIG. 6B, after being reflected and input to the port 7 of the second 90° hybrid coupler 416 of the TRAS 450 due to, for example, a failure of the FEB 420 or antenna 422, a transmit signal (B' Φ4') is separated into two signals (B'/2 ∠ (Φ3'−90°), B'/2 ∠ Φ3') having an amplitude of ½ of the transmit signal and a phase difference of 90° between each other. The separated two signals (B'/2 ∠ (Φ3'−90°), B'/2 ∠3') each are input to the second and first phase difference correctors 414 and 430 through the ports 5 and 6. After being input to the second and first phase difference correctors 414 and 430, the two signals (B'/2 ∠ (Φ3'−90°), B'/2 ∠ Φ3') are delayed by substantially the same amount, and are corrected for phase differences that can be generated in elements on their respective transmission paths, and are input to the second and first two-state phase converter blocks 412 and 428. After being input to the second and first two-state phase converter blocks 412 and 428, the separated two transmit signals (B'/2 ∠ (Φ3'−90°), B'/2 ∠ Φ3') are delayed by substantially the same amount, and are varied by substantially the same amplitude (ΔE) and a phase (ΔΦ) (i.e., B'/2 ∠ (Φ3'−90°)→A'/2 ∠ (Φ2'−90°), B'/2 ∠ Φ3'→A'/2 ∠ Φ2'), and are input to the ports 4 and 3 of the first 90° hybrid coupler 410, respectively. As shown in FIG. 6A, after being input through the ports 3 and 4, the two transmit signals (A'/2 ∠ Φ 2', A'/2 ∠ (Φ2'−90°)) are coupled as one transmit signal (A' ∠ Φ1'). The coupled transmit signal (A' ∠ Φ1') is output through the port 1 and is absorbed by the isolator (not shown). The port 2 of the first 90° hybrid coupler 410 is isolated and the RF switch 426 is in an open state, thus avoiding the introduction of the transmit signal into the LNA 408.

Last, a more detailed explanation of an exemplary operation in a reception mode is described with reference to FIGS. 7A and 7B.

In the reception mode, a signal is received through the antenna 422 and is input to the LNA 408 through a path of the FEB 420→second 90° hybrid coupler 416→first and second phase difference correctors 430 and 414→first and second two-state phase converter blocks 428 and 412→first 90° hybrid coupler 410→RF switch 426. In the reception mode, it is important to reduce a loss of a signal that is generated between the antenna 422 and the LNA 408, which has a direct influence on the system Noise Figure (NF).

Figures 7A, 7B:
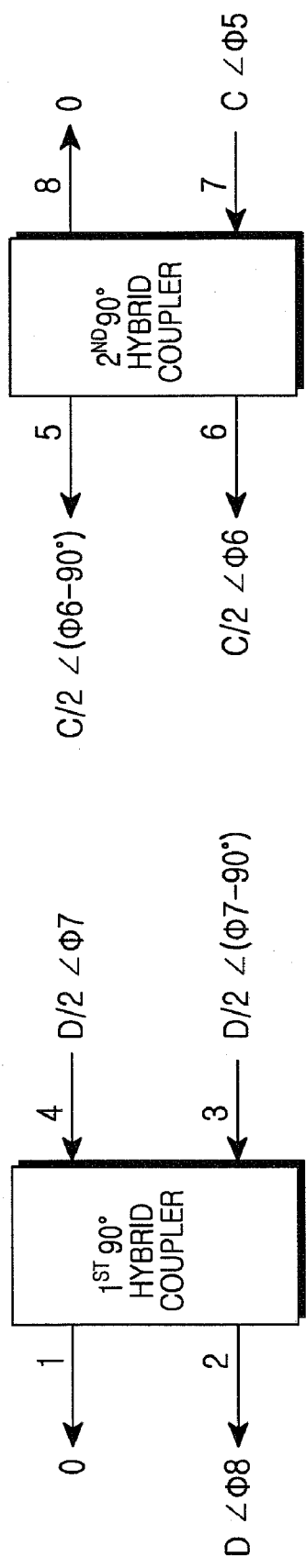
FIGS. 7A and 7B are diagrams illustrating an operation of a 90° hybrid coupler in a reception mode in a TRAS apparatus according to an exemplary embodiment of the present invention.

Referring to FIGS. 7A and 7B, upon receipt through the antenna 422, a receive signal is input to the port 7 of the second 90° hybrid coupler 416 through the FFB 420. As shown in FIG. 7B, a receive signal (C ∠ Φ5) is input through the port 7 and is separated into two signals (C/2 ∠ (Φ6−90°), C/2 ∠ Φ6), wherein each of the two signals has an amplitude of ½ of the receive signal and a phase difference between the two signals is 90°. The separated signals (C/2 ∠ (Φ6−90°), C/2 ∠ Φ6) are input to the second and first phase difference correctors 414 and 430 through the ports 5 and 6, respectively. After being input to the first and second phase difference correctors 430 and 414, the receive signals (C/2 ∠ Φ6, C/2 ∠ (Φ6−90°)) each are delayed by the same amount, and are corrected for phase differences that can be generated in elements on a reception path, and are input to the first and second two-state phase converter block 428 and 412, respectively.

The receive signal (C/2 ∠ (Φ6−90°)) input to the second two-state phase converter block 412 is delayed by a preset amount. The receive signal (C/2 ∠ (Φ6−90°)) is also varied by an amplitude (ΔE) and a phase (ΔΦ) (i.e., C/2 ∠ (Φ6−90°)→ D/2 ∠ Φ7), and is input to the port 4 of the first 90° hybrid coupler 410. The receive signal (C/2 ∠ Φ6) input to the first two-state phase converter block 428 is delayed by substantially the same preset amount. The receive signal (C/2 ∠ Φ6) is also varied by the amplitude (ΔE), and is varied in phase by the amount (ΔΦ−180°) having a difference of 180° with the phase (ΔΦ) (i.e., C/2 ∠ Φ6→D/2 ∠ (Φ7−90°)), and is input to the port 3 of the first 90° hybrid coupler 410. After that, as shown in FIG. 7A, the two receive signals (D/2 ∠ (Φ7−90°), D/2 ∠ Φ7) input through the ports 3 and 4 are coupled as one receive signal (D ∠ Φ8), and the receive signal (D ∠ Φ8) is output through the port 2. After being output through the port 2, the receive signal (D ∠ Φ8) is provided to the LNA 408 through the RF switch 426, which is in a closed position, with substantially no loss and is input to the receiver 406. The port 1 of the first 90° hybrid coupler 410 is isolated so that a transmission path with the PA 404 is isolated, thus avoiding the introduction of the receive signal into the PA 404, preventing the introduction of a high power high frequency transmit signal to the PA 404, and reducing a loss of the receive signal.

As described above, in a transmission mode, a TRAS apparatus 450 according to an exemplary embodiment of the present invention can protect an LNA of a receiving end by isolating a reception path from a transmit signal irrespective of normal and abnormal states of a transmission path using two 90° hybrid couplers and elements for adjusting a phase and compensating for a phase difference. Also, in a reception mode, the TRAS apparatus 450 can minimize a path loss by isolating a transmission path from a receive signal.

By providing a TRAS apparatus having isolation between transmit/receive paths using 90° hybrid couplers and elements for adjusting and compensating a signal phase in a TDD wireless communication system, an exemplary embodiment of the present invention has an effect of being able to protect an LNA of a receiving end from a high frequency transmit signal and, even in abnormal circumstances in which power is not applied or a transmit signal is reflected and turned back, etc., protect the LAN of the receiving end from the high frequency transmit signal. Also, an exemplary embodiment of the present invention has an effect of reducing a manufacturing cost of the TDD system and increasing the space efficiency and stability of the system, thus being able to enhance competitiveness.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus in a Time Division Duplex (TDD) wireless communication system, the apparatus comprising:
    two 90° hybrid couplers, each for separating a signal input through any one of four input/output ports into two signals having a phase difference of 90° between them and outputting the two signals through two ports of the four input/output ports, and each for coupling two signals input through two ports of the four input/output ports and outputting the coupled signal through one of the four input/output ports that varies depending on a phase difference of the two signals; and
    a phase converter block coupled between the two 90° hybrid couplers, the phase converter block for, in a transmission mode, varying phases of two signals received from the first 90° hybrid coupler among the two 90° hybrid couplers by substantially the same value and outputting the varied two signals to the second 90° hybrid coupler, and for, in a reception mode, varying phases of two signals received from the second 90° hybrid coupler among the two 90° hybrid couplers by a difference value and outputting the varied two signals to the first 90° hybrid coupler.

2. The apparatus of claim 1, further comprising a TDD controller for outputting a control signal, representing one of a transmission mode operation and a reception mode operation of the system, to the phase converter block.

3. The apparatus of claim 2, further comprising a phase conversion controller for converting a control signal output from the TDD controller into a signal of a type recognizable by the phase converter block.

4. The apparatus of claim 3, wherein, if power is not applied to the system, the phase conversion controller outputs the control signal representing the transmission mode operation to the phase converter block.

5. The apparatus of claim 1, wherein the first 90° hybrid coupler separates a signal received from a power amplifier of a transmit end into two signals having a phase difference of 90° between them and outputs the separated two signals to the phase converter block, and couples two signals received having a phase difference of ±90° between them from the phase converter block and outputs the coupled signal to one of the power amplifier and a low noise amplifier of a receiving end through an output port that varies depending on a phase difference of the two signals; and further wherein the second 90° hybrid coupler couples two signals having a phase difference of 90° between them received from the phase converter block and outputs the coupled signals to an antenna, and separates a signal from the antenna into two signals having a phase difference of 90° between them and outputs the separated two signals to the phase converter block.

6. The apparatus of claim 5, wherein, if the coupled signal is output to the power amplifier through the output port that varies depending on the phase difference of the two signals, the first 90° hybrid coupler isolates a path coupled to the low noise amplifier and, if the coupled signal is output to the low noise amplifier, isolates a path coupled to the power amplifier.

7. The apparatus of claim 1, wherein the phase converter block comprises:
    a first phase converter for varying an amplitude and phase of an input signal irrespective of the transmit/receive modes; and
    a second phase converter for, in the transmission mode, varying an amplitude and phase of an input signal by substantially the same variation amounts as those of the first phase converter and, in the reception mode, varying an amplitude of an input signal by substantially the same variation amount as that of the first phase converter and varying a phase of the input signal by a phase difference value of about 180° with the variation amount of the first phase converter.

8. The apparatus of claim 7, wherein the phase converter block further comprises:
    a first phase difference corrector, coupled between the first phase converter and the second 90° hybrid coupler, for compensating for a phase difference generated due to elements on transmission/reception paths; and
    a second phase difference corrector, coupled between the second phase converter and the second 90° hybrid coupler, for compensating for a phase difference generated due to elements on transmission/reception paths.

9. The apparatus of claim 1, further comprising a Radio Frequency (RF) switch, coupled between a low noise amplifier and the first 90° hybrid coupler for, in a transmission mode, disrupting a path between the low noise amplifier and the connected first 90° hybrid coupler and, in a reception mode, establishing the path between the low noise amplifier and the connected first 90° hybrid coupler.

10. The apparatus of claim 1, further comprising an isolator, coupled between a power amplifier and the first 90° hybrid coupler, for absorbing and terminating a transmit signal that is reflected due to an abnormal operation of at least one of the antenna and a front end block.

11. A method of controlling a Transmit/Receive Antenna Switch (TRAS) in a Time Division Duplex (TDD) wireless communication system, the method comprising:
    separating a transmit signal from a transmitter into two transmit signals having a phase difference of 90° between each other through a first 90° hybrid coupler in a transmission mode;
    varying phases of the separated two transmit signals through a phase converter block by substantially identical amounts, coupling the phase varied transmit signals as one transmit signal through a second 90° hybrid coupler, and outputting the coupled signal to an antenna;
    separating a signal received from the antenna into two receive signals having a phase difference of 90° between them through the second 90° hybrid coupler in a reception mode; and
    varying phases of the separated two receive signals by a difference value through the phase converter block, coupling the varied receive signals through the first 90° hybrid coupler, and outputting the coupled signal to a receiver.

12. The method of claim 11, wherein the 90° hybrid coupler separates a signal input through any one of four input/output ports into two signals having a phase difference of 90° between them and outputs the separated two signals through two of the four input/output ports, and couples two signals input through two of the four input/output ports and outputs the coupled signal through one of the four input/output ports that varies depending on a phase difference of the two signals.

13. The method of claim 11, further comprising generating a control signal representing one of a transmission mode operation and a reception mode operation.

14. The method of claim 13, further comprising, generating the control signal representing the transmission mode, if power is not applied to the system.

15. The method of claim 11, wherein, in a transmission mode, the first 90° hybrid coupler separates a transmit signal received from a power amplifier of a transmission end into two transmit signals a phase difference of 90° between them and, in a reception mode, couples two receive signals having a phase difference of ±90° between them and outputs the coupled signal to a low noise amplifier of a receiving end through an output port that varies depending on a phase difference of the two receive signals, and further wherein, in the transmission mode, the second 90° hybrid coupler receives and couples two transmit signals having a phase difference of 90° between them and outputs the coupled signal to an antenna and, in the reception mode, the second 90° hybrid coupler separates a receive signal from the antenna into two signals with a phase difference of 90° between them.

16. The method of claim 15, wherein, when two signals are input, if outputting the coupled signal to the power amplifier through the output port that varies depending on the phase difference of the input two signals, the first 90° hybrid coupler isolates a path coupling with the low noise amplifier and, if outputting the coupled signal to the low noise amplifier, isolates a path coupling with the power amplifier.

17. The method of claim 11, wherein the phase converter block varies, through a first phase converter, an amplitude and phase of an input signal irrespective of the transmit/receive modes, and further wherein, in the transmission mode, the phase converter block varies, through a second phase converter, an amplitude and phase of an input signal by substantially the same variation amounts as those of the first phase converter and, in the reception mode, varies an amplitude of an input signal by substantially the same variation amount as that of the first phase converter and varies a phase of the input signal by a phase difference value of 180° with the variation amount of the first phase converter.

18. The method of claim 17, wherein the phase converter block compensates for a phase difference generated due to elements on transmission/reception paths.

19. The method of claim 11, further comprising, disrupting a path between the low noise amplifier and the first 90° hybrid coupler through a Radio Frequency (RF) switch coupling the receiver and the first 90° hybrid coupler, in a transmission mode; and establishing the path between the low noise amplifier and the first 90° hybrid coupler through a Radio Frequency (RF) switch coupling the receiver and the first 90° hybrid coupler, in a reception mode.

20. The method of claim 11, further comprising, absorbing a transmit signal reflected due to an abnormal operation of at least one of the antenna and a front end block through an isolator positioned between the transmitter and the first 90° hybrid coupler; and terminating the transmit signal reflected due to an abnormal operation of at least one of the antenna and a front end block through an isolator positioned between the transmitter and the first 90° hybrid coupler.

* * * * *